US009977675B2

(12) United States Patent
Nystad

(10) Patent No.: US 9,977,675 B2
(45) Date of Patent: May 22, 2018

(54) NEXT-INSTRUCTION-TYPE-FIELD

(75) Inventor: Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 1398 days.

(21) Appl. No.: 13/137,657

(22) Filed: Sep. 1, 2011

(65) Prior Publication Data
US 2012/0079243 A1 Mar. 29, 2012

(30) Foreign Application Priority Data

Sep. 24, 2010 (GB) .................................. 1016072.9

(51) Int. Cl.
G06F 9/30 (2018.01)
G06F 9/38 (2018.01)

(52) U.S. Cl.
CPC ...... G06F 9/30145 (2013.01); G06F 9/30185 (2013.01); G06F 9/3851 (2013.01); G06F 9/3885 (2013.01)

(58) Field of Classification Search
None
See application file for complete search history.

(56) References Cited

U.S. PATENT DOCUMENTS

| 4,953,078 | A * | 8/1990 | Petit .............................. 712/248 |
| 6,192,468 | B1 | 2/2001 | Mahalingaiah et al. |
| 6,904,514 | B1 * | 6/2005 | Sato .............................. 712/212 |
| 2003/0074543 | A1 | 4/2003 | Djafarian et al. |
| 2003/0191792 | A1 | 10/2003 | Waki et al. |
| 2005/0038550 | A1 | 2/2005 | Sato |
| 2010/0225656 | A1 | 9/2010 | Kim et al. |

FOREIGN PATENT DOCUMENTS

| CN | 101826056 | 9/2010 |
| EP | 0 652 509 | 5/1995 |
| EP | 0 949 564 | 10/1999 |

(Continued)

OTHER PUBLICATIONS

International Preliminary Report on Patentability dated Apr. 4, 2013 in PCT/GB2011/051589.

(Continued)

Primary Examiner — William B Partridge
(74) Attorney, Agent, or Firm — Nixon & Vanderhye P.C.

(57) ABSTRACT

A graphics processing unit core 26 includes a plurality of processing pipelines 38, 40, 42, 44. A program instruction of a thread of program instructions being executed by a processing pipeline includes a next-instruction-type field 36 indicating an instruction type of a next program instruction following the current program instruction within the processing thread concerned. This next-instruction-type field is used to control selection of to which processing pipeline the next instruction is issued before that next instruction has been fetched and decoded. The next-instruction-type field may be passed along the processing pipeline as the least significant four bits within a program counter value associated with a current program instruction 32. The next-instruction-type field may also be used to control the forwarding of thread state variables between processing pipelines when a thread migrates between processing pipelines prior to the next program instruction being fetched or decoded.

25 Claims, 8 Drawing Sheets

(56) References Cited

FOREIGN PATENT DOCUMENTS

| EP | 1 215 569 | 6/2002 |
|---|---|---|
| JP | S63-234322 | 9/1988 |
| JP | S64-46134 | 2/1989 |
| JP | H05-346854 | 12/1993 |
| JP | H06-28187 | 2/1994 |
| JP | H11-296381 | 10/1999 |
| JP | 2000-215059 | 8/2000 |
| WO | 01/16710 | 3/2001 |
| WO | WO 01/25900 | 4/2001 |

OTHER PUBLICATIONS

UK Search Report for GB Application No. 1016072.9, dated Jan. 13, 2011.
Kingyens, J.R.C., "A GPU-Inspired Soft Processor for High-Throughput Acceleration", (2008), 71 pages.
International Search Report and Written Opinion of the International Searching Authority dated Oct. 24, 2011 in PCT/GB2011/051589.
English translation of Taiwanese Office Action and Search Report dated Mar. 16, 2015 in TW 100133041, 3 pages.
Chinese Second Office Action dated Jul. 15, 2015 in CN 201180045065.2 and English translation, 29 pages.
Chinese Third Office Action dated Feb. 6, 2016 issued in CN 201180045065.2 and English translation, 7 pages.
Korean Office Action dated Nov. 30, 2016 in KR 10-2013-7005861 and English translation, 6 pages.
European Office Action dated Jan. 25, 2017 in EP 11752622.8, 5 pages.
Israeli Office Action dated Nov. 23, 2014 in corresponding IL application and partial English translation, 3 pages.
Japanese Office Action dated Sep. 1, 2014 in JP 2013-529706 and English translation, 26 pages.
Chinese Office Action and Search Report dated Nov. 4, 2014 in CN 201180045065.2 and English translation, 31 pages.
UK Examination Report dated Aug. 30, 2017 in GB 1016072.9, 4 pages.
Malaysian Office Action dated Aug. 15, 2017 in MY PI 2013700237, 3 pages.
Korean Office Action dated Jul. 27, 2017 in KR 10-2013-7005861 and English translation, 13 pages.
UK Examination Report dated Jan. 25, 2018 in GB 1016072.9, 4 pages.

* cited by examiner

Type Encoding

| Meaning | [next_instruction_type] |
|---|---|
| Thread termination | TT |
| Load/Store | LS |
| Texture0 | TX0 |
| ⋮ | ⋮ |
| Arithmetic N | A0 |
| Arithmetic 2N | A1 |
| Arithmetic 3N | A2 |
| ⋮ | ⋮ |
| Indirect Branch | ID |
| Reserved | R0 |
| ⋮ | ⋮ |

FIG. 8

NEXT-INSTRUCTION-TYPE-FIELD

BACKGROUND

This invention relates to the field of data processing systems. More particularly, this invention relates to how a next instruction to be executed may be specified within a data processing system.

It is known to provide data processing systems which execute a sequence of program instructions from a thread of program instruction for execution. Within such systems, instruction prefetching circuitry and branch prediction circuitry may be used to prefetch instructions to be executed and to predict the flow of execution when branches are encountered such that a processing pipeline can be supplied with new instructions to be executed before a branch instruction has been resolved. These measures are effective in enabling deep processing pipelines to be supported and utilised with high efficiency. However, the overhead in terms of circuit area, circuit complexity, power consumption and expense associated with these mechanisms is becoming increasingly significant.

It is also known to provide data processing systems which concurrently execute multiple program threads. An example of such systems are graphics processing units in which, for example, more than a hundred program threads may execute in parallel, each program thread corresponding to a different part of a graphics image being processed. The known mechanisms for instruction prefetching and branch prediction do not scale well to such systems. The overhead associated with these mechanisms when seeking to prefetch instructions for a large number of separate threads as well as to predict branch behaviour for this large number of program threads is disadvantageous. However, simply waiting until a program instruction being executed completes and then fetching the next instruction incurs a significant prefetch latency. This disadvantage is also becoming more significant as the use of systems executing a large number of parallel threads becomes more widespread and applied to more general purpose processing (beyond the field of graphics processing) where the prefetch latency becomes more apparent.

SUMMARY

Viewed from one aspect the present invention provides apparatus for processing data in response to one or more threads of program instructions, said apparatus comprising:

data processing circuitry configured to be responsive a current program instruction within a thread of program instructions to perform a current data processing operation specified by said current program instruction, wherein said current program instruction includes a next-instruction-type field specifying a type of a next program instruction to be executed within said thread.

The present technique provides a next-instruction-type field within a current program instruction. This moves against the technical prejudice in the field which is to seek to reduce the size of program instructions. With this technical prejudice in mind, it will be appreciated that providing the next-instruction-type field within the current program instruction as well as providing the next program instruction itself represents a redundancy within the program since the next program instruction itself will also specify the type of the next program instruction. However, the present technique recognises that the additional program size overhead of the next-instruction-type field within the current program instruction can be exploited to provide a number of practical advantages.

The data processing circuitry may perform one or more processing operations under control of the next-instruction-type field. This permits the current program instruction to initiate processing operations associated with the next instruction which would otherwise have to wait until the next program instruction was, for example, fetched and decoded.

In some embodiments the part of the processing performed in response to the next-instruction-type field may be undertaken before all of the next program instruction has been fetched, or even started to be fetched, from a memory storing in that next program instruction.

The present techniques have particular utility in the field of systems including a plurality of processing pipelines. While the plurality of processing pipelines may all be identical, in many embodiments a plurality of different types of processing pipeline will be provided with each different type of processing pipeline being configured to perform a different type or types of processing operation. As an example, the plurality of processing pipelines may include one or more of an arithmetic pipeline, a load/store pipeline and a texturing pipeline.

In the context of a system including a plurality of processing pipelines, the part of the processing of the next program instruction performed under control of the next-instruction-type field may include selection of the next processing pipeline to which the next program instruction is directed for execution. Thus, for example, the next-instruction-type field may be used to control scheduling circuitry which schedules the next program instruction to an appropriate next processing pipeline. As an example, arithmetic instructions may be directed toward an arithmetic pipeline, load/store instructions may be directed towards a load/store pipeline and texturing instructions may be directed toward a texturing pipeline.

The next processing pipeline to which the next-instruction-type field directs the next program instruction during execution of the current program instruction by a current processing pipeline may be the same processing pipeline as the current processing pipeline or a different processing pipeline from the current processing pipeline.

Each processing pipeline may have associated queue circuitry provided to store a queue of program instructions to be executed by that pipeline. Within such systems the current processing pipeline may be controlled by the next-instruction-type field to trigger the adding of the next program instruction to the queue matching the next-instruction-type field.

The adding of a next program instruction to such a queue may be conveniently performed in response to the current program instruction being retired from the current processing pipeline whereupon as one program instruction retires another program instruction for that thread is added to the queue of instructions to be executed. As program instructions from a large number of different threads will be concurrently undergoing processing at different pipeline stages within different pipelines, the overall data throughput is not significantly reduced by waiting until the current program instruction of a thread is retired before the next program instruction of that thread is placed into a queue for execution. As program instructions from different threads will already be being executed in the hardware, the hardware is kept at a high level of utilisation and efficiency.

Another example of the part of processing which may be controlled by the next-instruction-type field includes routing one or more state variables associated with the next program instruction to the next processing pipeline. In this way, if a thread migrates between pipelines, then state variables associated with that thread may be made available more rapidly in the new pipeline by virtue of the earlier indication of the migration provided by the next-instruction-type field within the current program instruction.

Other examples of the part of processing which may be controlled by the next-instruction-type field include pre-decoding of the next program instruction, pre-fetching of the next program instruction and dispatching of the next program instruction.

The current program instruction may have associated therewith a current program counter value. A portion of this current program counter value extending from a least significant bit position thereof may be used to store a value indicative of the next-instruction-type field. This low order portion of the program counter is often unused in systems with relatively large aligned program instructions.

Within such systems, the program counter value may be derived by a logical OR operation combining a memory address within the memory storing the current program instruction and the next-instruction-type field aligned with the least significant bit end of the memory address.

It will be appreciated that while the present techniques could be used within a system executing a single thread of program instructions, the techniques are particularly useful when a plurality of threads are being executed.

Implementation of the present techniques is simplified when the next-instruction-type field is located in a fixed predetermined position within the program instructions.

A thread of program instructions will not execute indefinitely and accordingly control of the operations to be performed when a thread ceases may be conveniently supported in embodiments in which one value of the next-instruction-type field is a termination type indicating that the thread is terminated with the current instruction.

It will be appreciated by those in the field that one type of current program instruction may be an indirect branch operation. With such indirect branch instructions the pointer to the memory address storing the next program instruction is calculated by the next indirect branch instruction itself. While the type of the next program instruction may be known and encoded within the next-instruction-type field of the indirect branch instruction, the target address for the indirect branch instruction may be formed by combining the address calculated with the next-instruction-type field thereby permitting mechanisms for controlling the part of processing based on the program counter value to be reused based upon the pointer calculated as the target address by the indirect branch instruction.

As mentioned above, the next-instruction-type field and the next program instruction together represent a degree of redundant information present within the program instructions of the thread. This redundancy can be exploited by detecting any mismatch between the next-instruction-type field and the next program instruction to generate an exception indicative of corruption in at least one of these items. In this way, a degree of protection may be achieved against data corruption of the instructions.

The processing performed under control of the next-instruction-type field will often be performed before decoding of the next program instruction occurs. The next-instruction-type field can thus provide a way of at least partially addressing the latency which would otherwise be associated with having to wait until the full fetching, issue and decoding of the next program instruction has taken place.

It will be appreciated that the present techniques have application to the field of data processing apparatus in general, such as general purpose processors, digital signal processors and the like. However, the techniques are particularly well suited to systems in which the processing apparatus comprises a graphics processing unit and the one or more threads comprise a plurality of graphics processing threads. These highly parallel multi-threaded systems are ill-suited to conventional instruction prefetching mechanisms and branch prediction mechanisms and can benefit significantly from the use of the next-instruction-type field within the current program instruction.

Viewed from another aspect the present invention provides apparatus for processing data in response to one or more threads of program instructions, said apparatus comprising:

data processing means for performing a current data processing operation specified by a current program instruction within a thread of program instructions, wherein said current program instruction includes a next-instruction-type field specifying a type of a next program instruction to be executed within said thread.

Viewed from a further aspect the present invention provides a method of processing data in response to one or more threads of program instructions, said method comprising the steps of:

in response a current program instruction within a thread of program instructions, performing a current data processing operation specified by said current program instruction, wherein said current program instruction includes a next-instruction-type field specifying a type of a next program instruction to be executed within said thread.

Viewed from a further aspect the present invention provides a computer program product having a non-transitory form and storing a computer program for controlling a data processing apparatus to perform data processing in response to one or more threads of program instructions, wherein said computer program includes a current program instruction of a thread of program instruction, said current program instruction including a next-instruction-type field specifying a type of a next program instruction to be executed within said thread.

Viewed from a further aspect the present invention provides a virtual machine comprising a computer executing a program to provide a virtual machine implementation of an apparatus for processing data as mentioned above. It will be appreciated that virtualisation of processing apparatus is becoming more practical and accordingly one type of implementation of the present techniques is a virtual machine implementation where a general purpose processor is controlled by a computer program to act as a processing apparatus as discussed above.

The above, and other objects, features and advantages of this invention will be apparent from the following detailed description of illustrative embodiments which is to be read in connection with the accompanying drawings.

BRIEF DESCRIPTION OF THE DRAWINGS

FIG. 8 gives an example of different types of next-instruction-type field used to represent different types of the next program instruction.

DESCRIPTION OF EXAMPLE EMBODIMENTS

Figure 1:
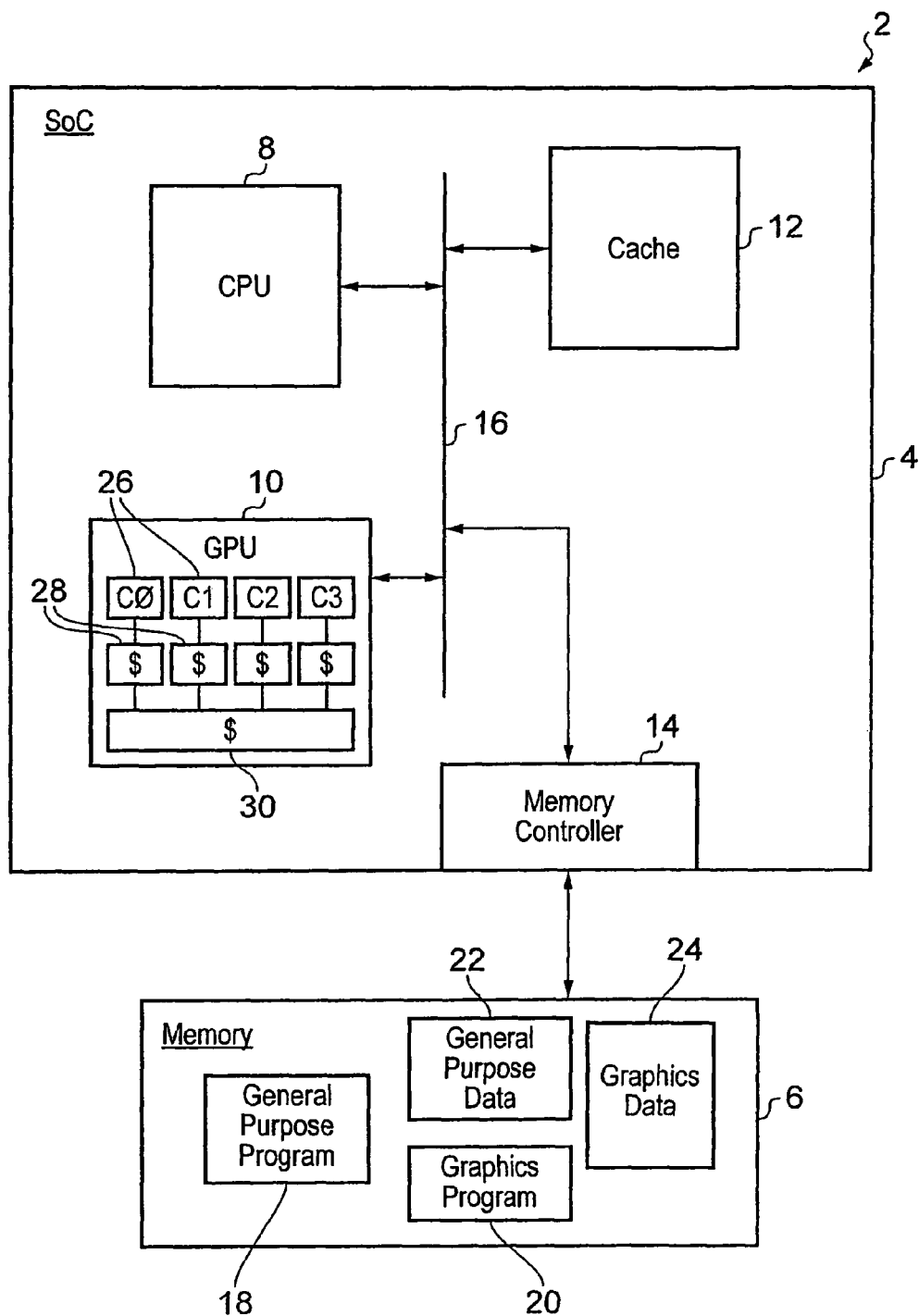
FIG. 1 schematically illustrates a processing apparatus including a graphics processing unit utilising a next-instruction-type field within a current program instruction.

FIG. 1 schematically illustrates a data processing system 2 comprising a system-on-chip integrated circuit 4 connected to a memory 6. The system-on-chip integrated circuit 4 includes a general purpose processor core 8, a graphics processing unit 10, a system-on-chip cache memory 12 and a memory controller 14 all linked via a system bus 16. The memory controller 14 provides access to the memory 6. The memory 6 stores a general purpose program 18 executed by the general purpose processor 8, a graphics program 20 executed by the graphics processing unit 10 as well as general purpose data 22 for manipulation by the general purpose core 8 and graphics data 24 for manipulation by the graphics processing unit 10.

The graphics processing unit 10 includes a plurality of graphics processing unit cores 26 which each execute program instructions of multiple threads in parallel within each core and between cores. Each of these graphics processing unit cores 26 may comprise multiple processing pipelines and each of these processing pipelines may execute program instructions from different program threads within different stages of its instruction pipeline. Thus, the total number of program threads being executed at any given time by the graphics processing unit 10 may be high, e.g. in excess of a hundred.

Each of the graphics processing unit cores 26 has a Level 1 cache 28 associated therewith for its own use. The graphics processing unit cores 26 also share a Level 2 cache 30 provided as part of the graphics processing unit 10. It will be appreciated that the graphics processing unit 10 may contain a large number of further local caches and data stores in order to improve its performance. These details have been omitted from FIG. 1 for the sake of clarity.

Figure 2:
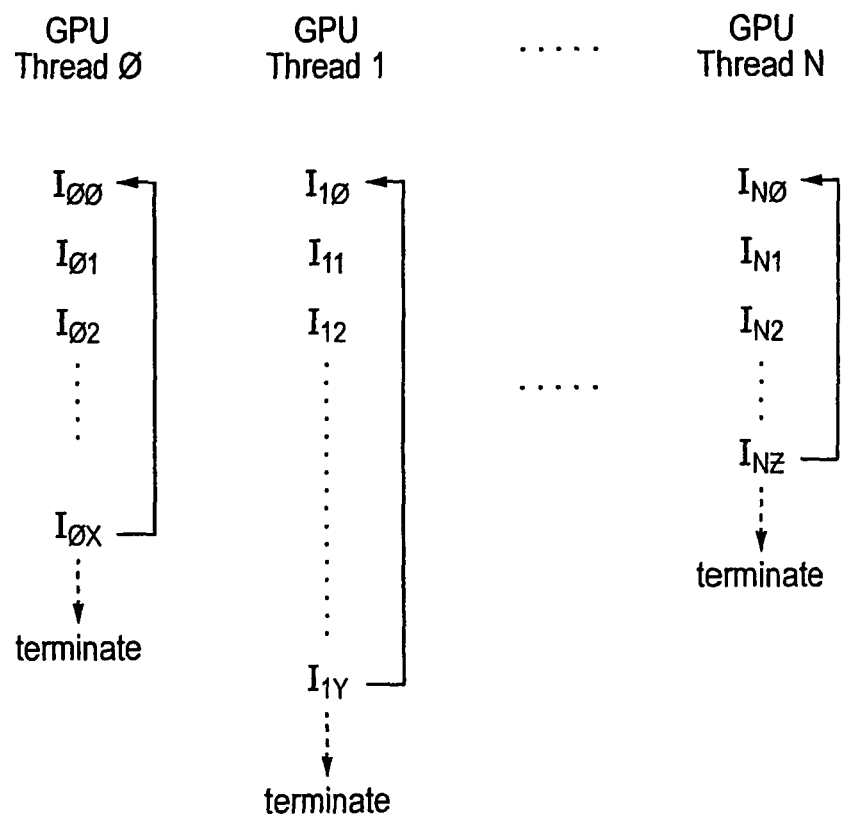
FIG. 2 schematically illustrates multiple program threads executing in parallel.

FIG. 2 schematically illustrates a plurality of threads of program instructions which may be executed in parallel by the graphics processing unit 10. In this example there are N+1 threads of program instructions executed in parallel. Thread 0 contains X+1 program instructions. These program instructions of Thread 0 are executed in a loop until a termination condition is met. It will be appreciated by those in this technical field that it is typical that many instances of the same program may be executed in parallel as separate threads with each of the threads performing the same manipulation upon a different region of a graphics image. In this case, the different program threads may have the same number of program instructions located therein. It is also possible for different program threads to be executed using different code and for different purposes. Such threads may also execute in parallel. As an example, there may be a set of threads performing an arithmetic operation (e.g. vertex rotation) and a different set of threads performing a texturing operation upon pixel values.

Figure 3:
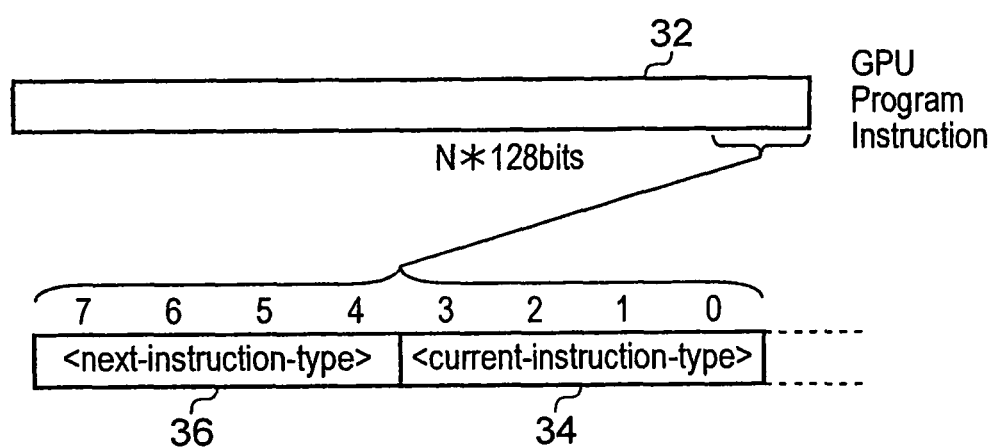
FIG. 3 schematically illustrates a next-instruction-type field within a current program instruction.

FIG. 3 schematically illustrates a current program instruction 32. The current program instruction 32 includes within its first byte a 4-bit current-instruction-type field 34 and a 4-bit next-instruction-type field 36. The current-instruction-type field 34 encodes the type of instruction corresponding to the current instruction 32, e.g. whether the current instruction 32 is an arithmetic instruction, a load/store instruction, a texturing instruction, a branch instruction or the like. The next-instruction-type field 36 encodes this same type information but in respect of the next program instruction following the current program instruction 32 within the thread of program instructions being executed. The next-instruction-type field 36 increases the size of the current program instruction 32, but provides the possibility for performing part of the processing associated with the next program instruction before that next program instruction has been decoded or before the next program instruction has even been fetched. This can reduce the latency associated with the fetching and decoding of the next program instruction.

Figure 4:
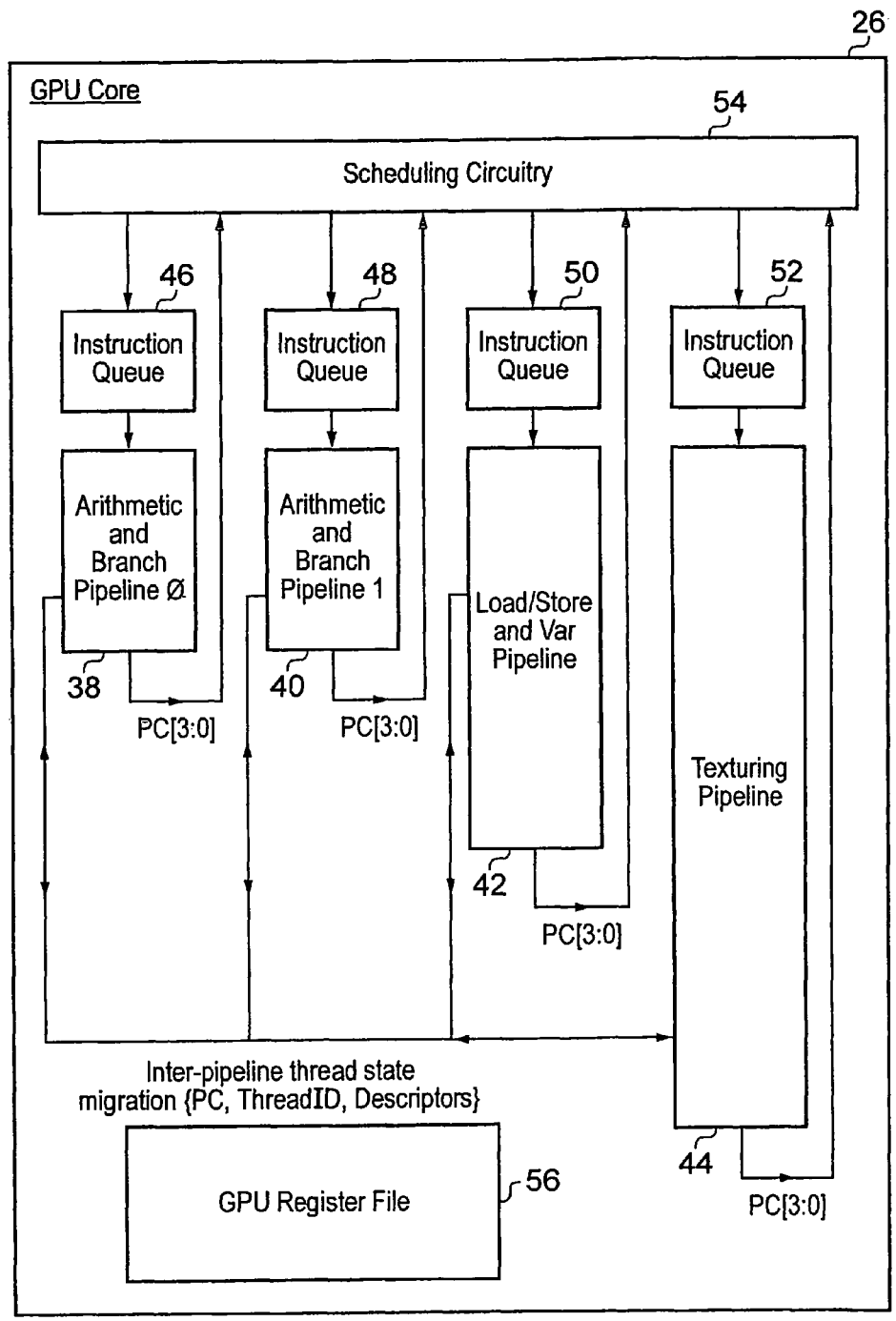
FIG. 4 schematically illustrates a graphics processing unit core.

FIG. 4 schematically illustrates a graphics processing unit core 26. The graphics processing unit core 26 includes a plurality of processing pipelines including a first arithmetic and branch pipeline 38, a second arithmetic and branch pipeline 40, a load/store and variable pipeline 42 and a texturing pipeline 44. These different processing pipelines 38, 40, 42, 44 are of different types and perform different types of processing operation. The arithmetic and branch pipelines 38, 40 each perform arithmetic and branch processing operations. The load/store and variable pipeline 42 performs processing operations associated with loads and stores to the memory 6 as well as operations associated with variables which may be fixed or programmable. The texturing pipeline 44 performs texturing pixel processing operations utilising texture data stored within the graphics data 24 as used by shader programs for generating pixel values within a graphics image being generated.

Each of the processing pipelines 38, 40, 42, 44 has an associated instruction queue 46, 48, 50, 52 into which program instructions to be executed by that processing pipeline 38, 40, 42, 44 are placed pending their issue into the processing pipeline 38, 40, 42, 44. Scheduling circuitry 54 is responsible for adding program instructions into the respective instruction queues 46, 48, 50, 52. Thus, the scheduling circuitry 54 selects the appropriate processing pipeline 38, 40, 42, 44 into which a program instruction is to be placed. Texturing instructions should be placed in instruction queue 52, load/store instructions and instructions associated with variables should be placed in instruction queue 50. Arithmetic instructions and branch instructions should be placed in one of the instruction queues 46 or 48.

When a new thread is being executed for the first time, then the first instruction of that thread will need to be at least partially decoded by the scheduling circuitry 54 in order to determine to which of the instruction queues 46, 48, 50, 52 that first instruction should be placed. Alternatively a pointer to the first instruction in a new thread may encode in its least significant bits the type of that first instruction as described further below. Once a first program instruction of a program thread has been executed and reaches its retirement stage within its appropriate processing pipeline 38, 40, 42, 44, the next-instruction-type field 36 associated with that current program instruction can be used to control the scheduling circuitry 54 to schedule the next program instruction into the instruction queue 46, 48, 50, 52 that matches (i.e. as specified by) the next-instruction-type field 36 of the current program instruction. If the first program instruction was an arithmetic instruction and the second program instruction was also an arithmetic instruction, then the next-instruction-type-field 36 would indicate that the second program instruction should be placed in the same instruction queue as the first program instruction (this avoids having to migrate thread state variables (data) to the other arithmetic pipeline). However, it is possible for program threads to migrate between processing pipelines 38, 40, 42, 44 as different types of program instruction within that thread require execution. Thus, a first portion of a thread may be arithmetic instructions followed by one or more texturing instructions. At the time that the program thread migrates, as indicated by the next-instruction-type field 36 within the last of the arithmetic instructions, thread state variables associated with the thread may also be migrated across from the relevant one of the arithmetic and branch pipelines 38, 40 to the texturing pipeline 44. The thread state variables may include a program counter value, a thread identifier, descriptors associated with the thread and the like. This thread state may be required by the processing pipeline 44 to which the thread has been migrated. This migration of thread state variables may be controlled by the next-instruction-type field within the last program instruction executed upon the previous processing pipeline 38, 40 and thus may be initiated prior to the first program instruction to be executed on the new processing pipeline 44 actually being either fetched or decoded.

It will be appreciated that the control of the scheduling circuitry 54 is performed based upon the next-instruction-type field 36. The next-instruction-type field 36 may be stored within the instruction pipelines 38, 40, 42, 44 in a convenient manner by using the unused least significant bits of the program counter value which is associated with each program instruction at each stage within the processing pipelines 38, 40, 42, 44 as a consequence of the use of large aligned instructions. As the program instructions in this example embodiment are multiples of 128 bits in length, the least significant four bits of program counter PC [3:0] will be unused (the program instructions are 128-bit aligned within the memory 6) and according this bit space within the program counter values can be conveniently used to store the next-instruction-type field 36 associated with the current program instruction corresponding to that program counter value PC. Thus, as illustrated in FIG. 4, when a current program instruction reaches the end of a processing pipeline 38, 40, 42, 44 and is being retired from the pipeline, then at this stage the least significant bit portion of the program counter value PC [3:0] can be supplied to the scheduling circuitry 54 to indicate the type of the next program instruction and accordingly direct the instruction queue 46, 48, 50, 52 to receive that next instruction.

The next-instruction-type field 36 can also be used at other points along the progress of the current program instruction through the processing pipelines 38, 40, 42, 44 to control a part of the processing associated with the next program instruction. The part of processing of the next program instruction controlled in this way may include one or more of pre-decoding the next program instruction, pre-fetching the next program instruction and dispatching the next program instruction. Other possibilities are for the part of processing of the next program instruction will also be apparent to those in this technical field and are encompassed within the present techniques.

The graphics processing unit core 26 also includes a register file 56. The register file 56 includes the registers used by the different processing pipelines 38, 40, 42, 44 for their intra-pipeline manipulation of data values as well as for communication of data values between the different processing pipelines 38, 40, 42, 44.

Figure 5:
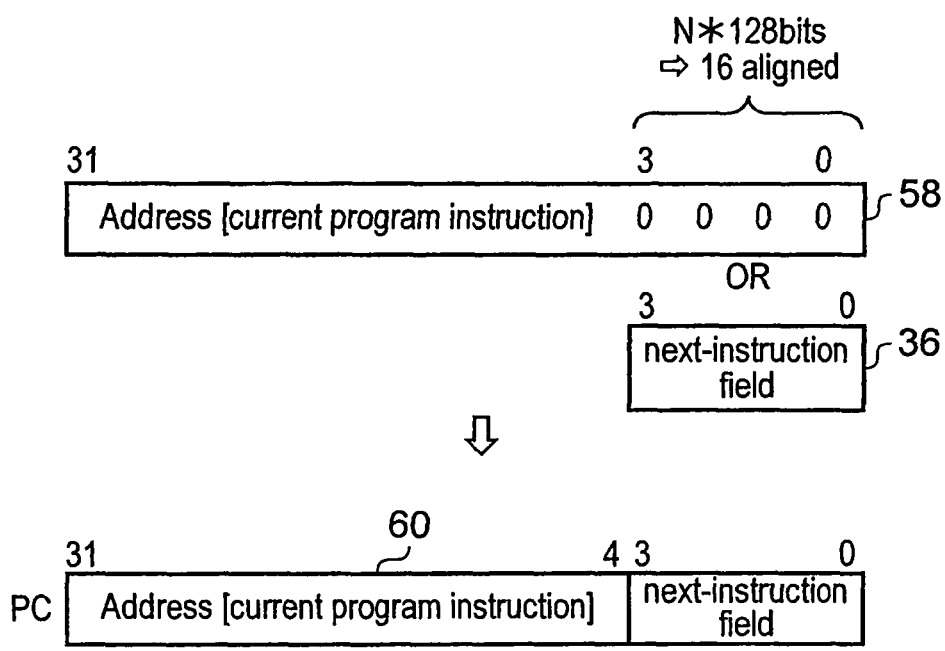
FIG. 5 schematically illustrates combining a memory address storing a current program instruction with a next-instruction-type field to produce a program counter value.

FIG. 5 schematically illustrates how a memory address 58 associated with a current program instruction 32 (which can be used to point to the next instruction by adding the current instruction length to the memory address of the current instruction) may be subject to a logical OR operation in respect of its least significant four bits with the next-instruction-type field 36 to produce a program counter value 60 which is stored with and accompanies the current program instruction 32 as it progresses along its processing pipeline 38, 40, 42, 44. As the program instructions are multiples of 128 bits in length and are 128 bit aligned within the memory 6, the least significant four bits of the memory address 58 are unused and accordingly may be filled with the next-instruction-type field 36 using this logical OR operation. At retirement of the current instruction from its processing pipeline, this program counter value can be directly used by the scheduling circuitry 54 to direct the next instruction to the appropriate instruction queue 46, 48, 50, 54 and to initiate the fetch of the next instruction from the memory system.

Figure 6:
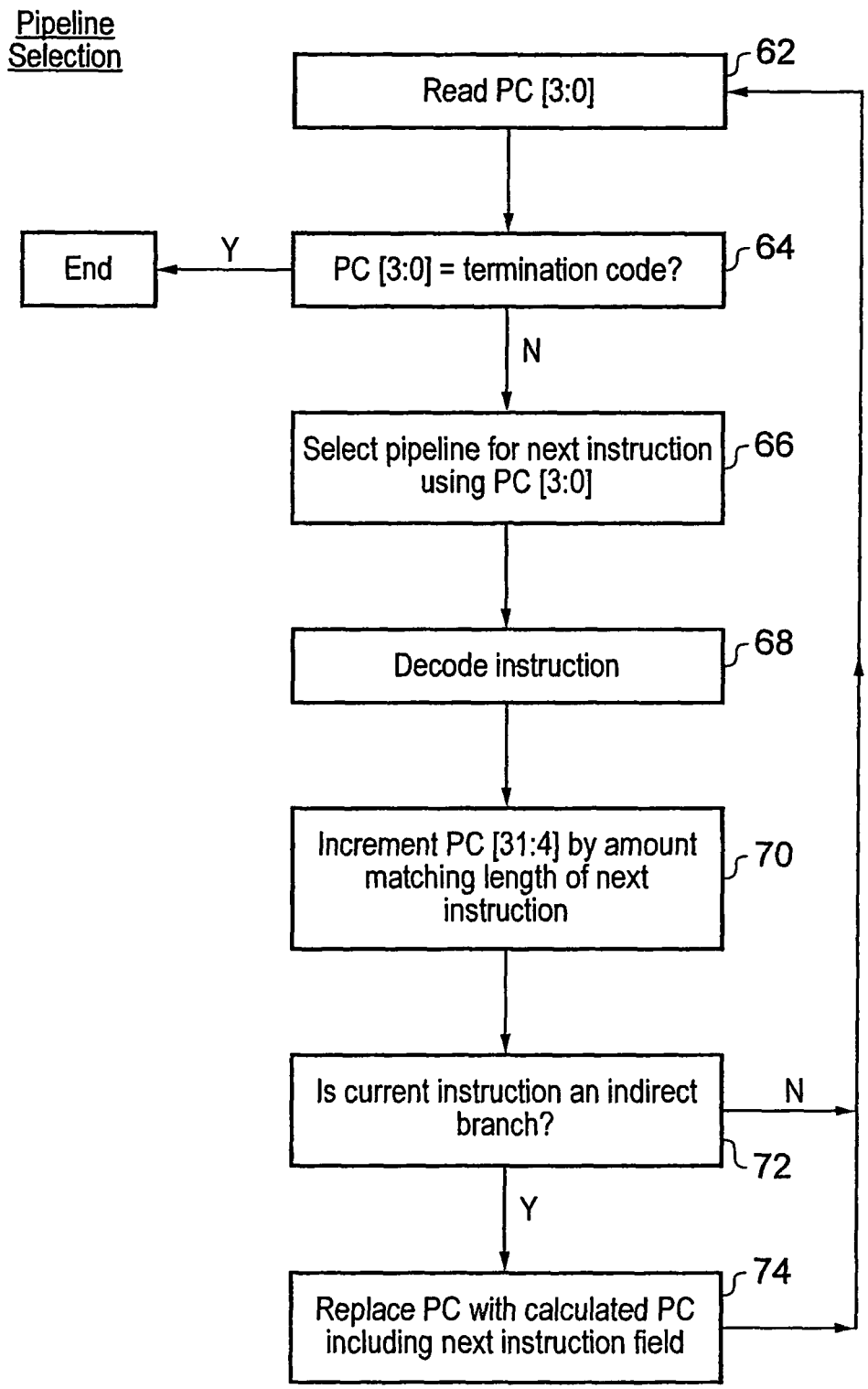
FIG. 6 is a flow diagram schematically illustrating the processing pipeline selection.

FIG. 6 is a flow diagram schematically illustrating pipeline selection as performed by the scheduling circuitry 54. At step 62 the least significant four bits of the program counter value 60 are read (these may have been supplied from the end of one of the processing stages 38, 40, 42, 44 upon retirement of a current program instruction). At step 64 the next-instruction-type field represented by PC [3:0] is compared with a termination code to determine whether or not the current program instruction 32 is the last in the program thread. If the current program instruction 32 is the last in a program thread, then the selection of the pipeline for that thread terminates (it will be handled by a separate processes for the new thread). If the thread is not terminating, then step 66 selects the pipeline into which the next program instruction is issued using the value of PC [3:0]. At this stage the flow diagram of FIG. 6 continues to describe the processing performed in respect of what was the next program instruction placed into the selected pipeline at step 66. At step 68 this program instruction is decoded. Step 70 then increments the program counter by an amount matching the length of the decoded instruction. At the same time the logical OR operation illustrated in FIG. 5 can be performed to place the next-instruction-type field 36 into the least significant four bits position of the incremented program counter value just generated. The program counter value thus points to the memory address of the next program instruction with the least significant four bits of the program counter indicating the type of this next instruction. The next-instruction-type field 36 can be read from the instruction from the bit positions illustrated in FIG. 3. These bit positions are fixed and predetermined for all of the instructions and accordingly are readily identified.

Step 72 determines whether the instruction decoder at step 68 is an indirect branch instruction. An indirect branch instruction if identified proceeds at step 74 to replace the program counter value generated at step 70 with one calculated by the branch instruction as the target address for that branch instruction and including the next-instruction-type field 36 in its least significant four bits. After either step 72 or 74, processing proceeds to step 62 when the instruction is retired from the relevant processing pipeline 38, 40, 42, 44.

Figure 7:
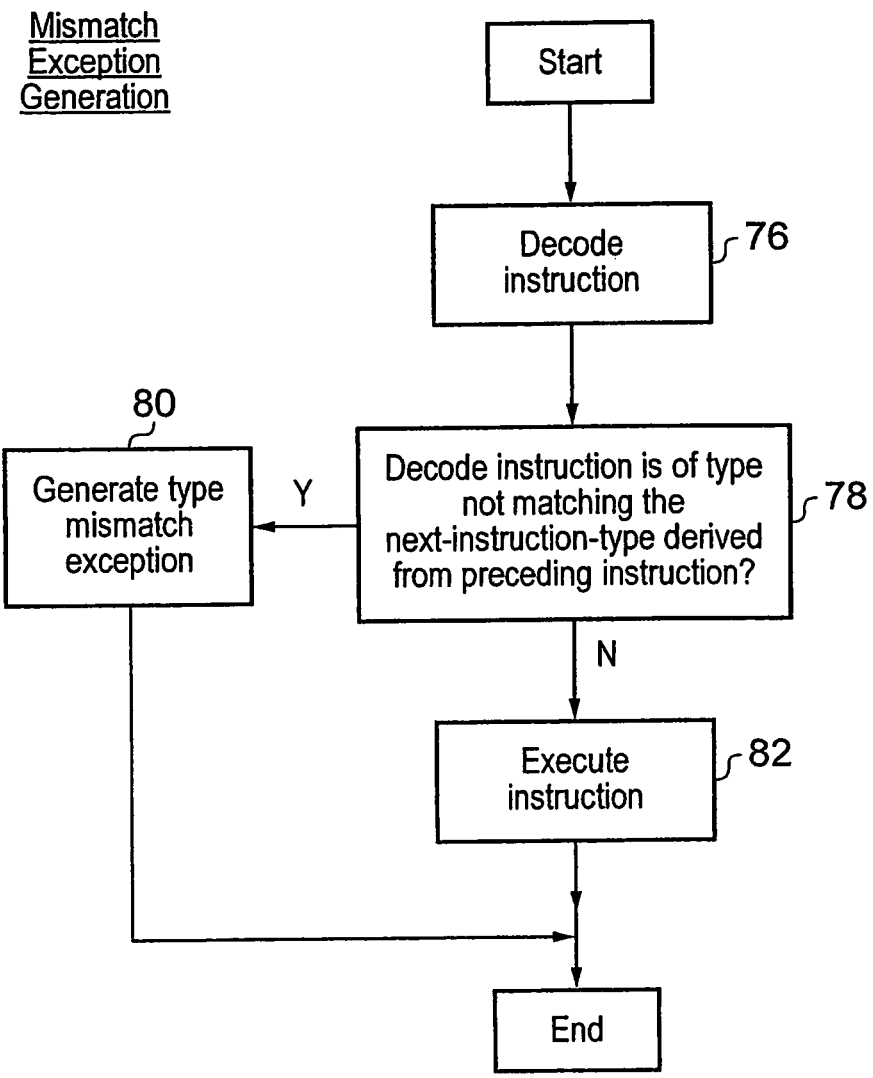
FIG. 7 is a flow diagram schematically illustrating the processing associated with mismatch exception generation.

FIG. 7 is a flow diagram schematically illustrating the generation of an exception when a mismatch occurs between the instruction decoded and the next-instruction-type field from the preceding instruction. Step 76 decodes an instruction. Step 78 compares the type of the instruction derived from the decoding of that instruction with the type of instruction that was indicated by the next-instruction-type field for that instruction which was read from the preceding instruction within the thread. If there is a mismatch between the types identified by these different mechanisms, then processing proceeds to step 80 where an exception is generated indicating that a mismatch of instruction type has occurred. This provides a degree of resistance to corruption in either (or both—providing the two corruptions do not happen to match) the next-instruction-type field 36 or the program instruction 32 itself. If there is no mismatch, then step 82 executes the instruction.

FIG. 8 illustrates different types of instruction which may be represented by the next-instruction-type field 36. There is one type corresponding to an instruction to be executed by the load/store pipeline 42. There is at least one instruction type to be executed by the texturing pipeline 44. There are multiple instruction types corresponding to different lengths of program instruction to be executed by one of the arithmetic and branch pipelines 38, 40. There is also an instruction type corresponding to an indirect branch to be executed by one of the arithmetic and branch pipelines 38, 40. The remaining possible encodings which may be represented by the four bits of the next-instruction-type field 36 are unused. It will be appreciated that the different four bit patterns for the next-instruction-type field 36 may be allocated in any different way to represent the different types of instructions.

Figure 9:
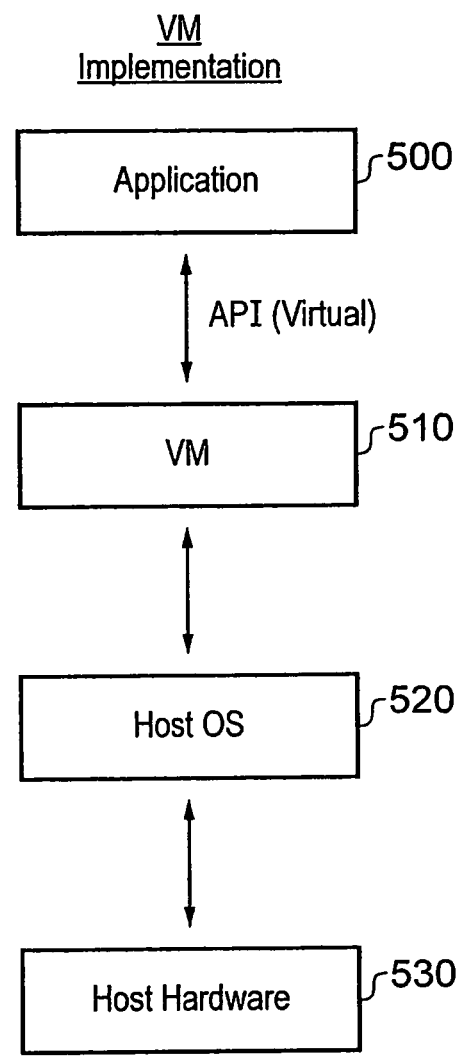
FIG. 9 schematically illustrates an apparatus for providing a virtual machine type implementation of the present techniques.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data in response to one or more threads of program instructions, said apparatus comprising:

data processing circuitry configured to be responsive to a current program instruction within a thread of program instructions to perform a current data processing operation specified by said current program instruction, wherein said current program instruction includes a current-instruction-type field specifying a type of said current program instruction, said current program instruction includes a next-instruction-type field specifying a type of a next program instruction to be executed within said thread, said type of said next program instruction identifying a pipeline to use or an instruction queue to receive said next program instruction, and said next-instruction-type field is redundant information as said next program instruction also specifies said type as specified by said next-instruction-type field and said current data processing operation is independent of said next-instructions-type field.

2. Apparatus as claimed in claim 1, wherein said data processing circuitry performs, under control of said next-instruction-type field, one or more processing operations forming a part of processing said next program instruction.

3. Apparatus as claimed in claim 2, wherein said part of processing is performed before all of said next program instruction has been fetched from a memory storing said next program instruction.

4. Apparatus as claimed in claim 2, wherein said processing circuitry comprises a plurality of processing pipelines.

5. Apparatus as claimed in claim 4, wherein said plurality of processing pipelines comprise a plurality of different types of processing pipeline, each of said different types of processing pipeline being configured to perform a different type of processing operation.

6. Apparatus as claimed in claim 4, wherein said plurality of processing pipelines comprise one or more of:
   an arithmetic pipeline configured to perform arithmetic processing operations;
   a load/store pipeline configured to perform load/store processing operations; and
   a texturing pipeline configured to perform pixel texturing processing operations.

7. Apparatus as claimed in claim 4, wherein said part of processing said next program instruction comprises selection of a next processing pipeline of said plurality of processing pipelines to which said next program instruction is directed for execution.

8. Apparatus as claimed in claim 7, comprising scheduling circuitry configured to be responsive to said next-instruction-type field to schedule said next program instruction for execution by said next processing pipeline.

9. Apparatus as claimed in claim 8, wherein said next processing pipeline is one of:
   a same one of said plurality of processing pipelines as said current processing pipeline; and
   a different one of said plurality of processing pipelines as said current processing pipeline.

10. Apparatus as claimed in claim 8, wherein said next processing pipeline comprises queue circuitry configured to store a queue of program instructions to be executed by said next processing pipeline, said current processing pipeline controlling adding said next program instruction to said queue under control of said next-instruction-type field.

11. Apparatus as claimed in claim 10, wherein said next program instruction is added to said queue in response to said current program instruction being retired from said current processing pipeline.

12. Apparatus as claimed in claim 7, wherein said part of processing comprises routing one of more state variables associated with of said next program instruction to said next processing pipeline.

13. Apparatus as claimed in claim 2, wherein said part of processing performed by said processing circuitry under control of said next-instruction-type field comprises one or more of:
   pre-decoding said next program instruction;
   pre-fetching said next program instruction; and
   dispatching said next program instruction.

14. Apparatus as claimed in claim 1, wherein as said processing circuitry performs said current data processing operation, a current program counter value is stored by said data processing circuitry associated with said current program instruction and a portion of said current program counter value extending from a least significant bit position thereof stores a value indicative of said next-instruction-type field.

15. Apparatus as claimed in claim 14, wherein a memory address within a memory storing said current program instruction is ORed with said next-instruction-type field aligned with a least significant bit end of said memory address to form said current program counter value.

16. Apparatus as claimed in claim 1, wherein said one or more threads comprises a plurality of threads.

17. Apparatus as claimed in claim 1, wherein said next-instruction-type field is located in a fixed predetermined position within program instructions of said thread of program instructions.

18. Apparatus for processing data in response to one or more threads of program instructions, said apparatus comprising:
   data processing circuitry configured to be responsive to a current program instruction within a thread of program instructions to perform a current data processing operation specified by said current program instruction, wherein
   said current program instruction includes a current-instruction-type field specifying a type of said current program instruction,
   said current program instruction includes a next-instruction-type field specifying a type of a next program instruction to be executed within said thread, and
   said next-instruction-type field is redundant information as said next program instruction also specifies said type as specified by said next-instruction-type field and said current data processing operation is independent of said next-instructions-type field, wherein one value of said next-instruction-type field is a termination type indicating that said thread is terminated.

19. Apparatus as claimed in claim 1, wherein when said current program instruction is an indirect branch instruction, said next-instruction-type field specifies part of a target memory address of said indirect branch storing said next program instruction.

20. Apparatus as claimed in claim 1, wherein said processing circuitry is responsive to a mismatch between said next-instruction-type field and said next program instruction to generate an exception indicative of corruption in at least one of said next-instruction-type field and said next program instruction.

21. Apparatus as claimed in claim 2, wherein full decoding of said next program instruction occurs after said part of said processing has been performed.

22. Apparatus for processing data in response to one or more threads of program instructions, said apparatus comprising:
   data processing circuitry configured to be responsive to a current program instruction within a thread of program instructions to perform a current data processing operation specified by said current program instruction, wherein
   said current program instruction includes a current-instruction-type field specifying a type of said current program instruction,
   said current program instruction includes a next-instruction-type field specifying a type of a next program instruction to be executed within said thread, and
   said next-instruction-type field is redundant information as said next program instruction also specifies said type as specified by said next-instruction-type field and said current data processing operation is independent of said next-instructions-type field, wherein said processing circuitry comprises a graphics processing unit and said one or more threads comprise a plurality of parallel graphics processing threads.

23. A method of processing data in response to one or more threads of program instructions, said method comprising the steps of:
   in response a current program instruction within a thread of program instructions, performing a current data processing operation specified by said current program instruction, wherein
   said current program instruction includes a current-instruction-type field specifying a type of said current program instruction,
   said current program instruction includes a next-instruction-type field specifying a type of a next program instruction to be executed within said thread, said type of said next program instruction identifying a pipeline to use or an instruction queue to receive said next program instruction, and
   said next-instruction-type field is redundant information as said next program instruction also specifies said type as specified by said next-instruction-type field and said current data processing operation is independent of said next-instructions-type field.

24. A computer program product having a non-transitory form and storing a computer program for controlling a data processing apparatus to perform data processing in response to one or more threads of program instructions, wherein
   said computer program includes a current program instruction of a thread of program instruction,
   said current program instruction includes both a current-instruction-type field specifying a type of said current program instruction and a next-instruction-type field specifying a type of a next program instruction to be executed within said thread,
   said type of said next program instruction identifies a pipeline to use or an instruction queue to receive said next program instruction, and
   said next-instruction-type field is redundant information as said next program instruction also specifies said type as specified by said next-instruction-type field and said current data processing operation is independent of said next-instructions-type field.

25. A computer program product as claimed in claim 24, wherein said thread comprises a plurality of program instructions and all of said program instructions within said thread include a next-program-type field.

* * * * *